US007916964B2

(12) United States Patent
Fukuoka (10) Patent No.: US 7,916,964 B2
(45) Date of Patent: Mar. 29, 2011

(54) IMAGE PROCESSING APPARATUS AND IMAGE PROCESSING METHOD

(75) Inventor: Tomohiro Fukuoka, Kasugai (JP)

(73) Assignee: Fujitsu Semiconductor Limited, Yokohama (JP)

(*) Notice: Subject to any disclaimer, the term of this patent is extended or adjusted under 35 U.S.C. 154(b) by 955 days.

(21) Appl. No.: 11/785,957

(22) Filed: Apr. 23, 2007

(65) Prior Publication Data

US 2007/0285441 A1 Dec. 13, 2007

(30) Foreign Application Priority Data

May 22, 2006 (JP) ................................. 2006-141669

(51) Int. Cl.
*G06K 9/44* (2006.01)
(52) U.S. Cl. ......... 382/260; 382/243; 382/261; 382/262
(58) Field of Classification Search ................... 382/264, 382/261, 170, 243, 260, 262, 263; 345/660
See application file for complete search history.

(56) References Cited

U.S. PATENT DOCUMENTS

| | | | | |
|---|---|---|---|---|
| 5,706,216 | A * | 1/1998 | Reisch | 708/203 |
| 5,930,007 | A * | 7/1999 | Kojima | 358/464 |
| 6,044,204 | A * | 3/2000 | Takamatsu et al. | 358/1.9 |
| 6,075,902 | A * | 6/2000 | Kojima | 382/260 |
| 6,233,060 | B1 * | 5/2001 | Shu et al. | 358/1.9 |
| 6,359,703 | B1 * | 3/2002 | Yabe | 358/1.9 |
| 6,628,842 | B1 | 9/2003 | Nagao | |
| 6,750,907 | B1 | 6/2004 | Sube | |
| 7,110,599 | B1 * | 9/2006 | Moriya et al. | 382/170 |
| 7,561,188 | B2 * | 7/2009 | Kondo et al. | 348/222.1 |
| 2002/0102029 | A1 * | 8/2002 | Sekiguchi et al. | 382/243 |
| 2003/0198399 | A1 | 10/2003 | Atkins | |
| 2004/0234135 | A1 * | 11/2004 | Nomizu | 382/209 |
| 2005/0135700 | A1 | 6/2005 | Anderson | |

FOREIGN PATENT DOCUMENTS

JP 4-188283 A 7/1992
(Continued)

OTHER PUBLICATIONS

Taiwanese Office Action issued on Jul. 28, 2010 for Taiwanese patent application No. 096113610. An English translation for the search report is provided. Japanese Notification of Ground for Rejection, English-language translation, mailed Nov. 16, 2010 for corresponding Japanese Application No. 2006-141669.
Partial English-language translation of JP-2001-014461-A.

*Primary Examiner* — Wesley Tucker
*Assistant Examiner* — Aklilu k Woldemariam
(74) *Attorney, Agent, or Firm* — Fujitsu Patent Center (57) ABSTRACT

An image processing apparatus and an image processing method for amplifying an image signal are provided without reducing an image size and without lowering a sense of resolution. An edge-direction detecting arithmetic section (2) detects an edge minimum direction from extracted Bayer data (BAY). An assigning arithmetic section (4) assigns a coefficient in which weighting is applied in the edge minimum direction of the extracted Bayer data (BAY) at a higher distribution ratio than other directions to a spatial filter kernel. In other words, the coefficient of the spatial filter kernel is changed in accordance with the edge minimum direction. A pixel adding arithmetic section (5) performs a sensitization process of extracted Bayer data (BAY). Therefore, it becomes possible to selectively perform a low-pass filtering process in the edge minimum direction. As a result, a sense of resolution can be prevented from being lost during the low-pass filtering process, and the sharpness of the outline of an image can be maintained.

10 Claims, 9 Drawing Sheets

IMAGE PROCESSING APPARATUS 1 ACCORDING TO FIRST EMBODIMENT

FOREIGN PATENT DOCUMENTS

| | | |
|---|---|---|
| JP | 05-012440 A | 2/1993 |
| JP | 07-249128 A | 9/1995 |
| JP | 2000-224473 A | 8/2000 |
| JP | 2001014461 | 1/2001 |
| JP | 2005-141498 A | 6/2005 |

* cited by examiner

FIG. 1 IMAGE PROCESSING APPARATUS 1 ACCORORDING TO FIRST EMBODIMENT

FIG. 2 BAYER DATA IBAY AND EXTRACTED BAYER DATA BAY

FIG. 3 FLOWCHART SHOWING OPERATION OF EDGE-DIRECTION DETECTING ARITHMETIC SECTION 2

FIG. 4   EDGE DETECTION

FIG. 5  SPATIAL FILTER KERNELS 71a THROUGH 73a

FIG. 6  SPATIAL FILTER KERNELS 81a THROUGH 83a

FIG. 7 FLOWCHART SHOWING OPERATION OF SPATIAL-FILTER-KERNEL SELECTING SECTION 41

FIG. 8 IMAGE PROCESSING APPARATUS 1a ACCORDING TO SECOND EMBODIMENT

FIG. 9 FLOWCHART SHOWING OPERATION OF CORRECTING ARITHMETIC SECTION 3

IMAGE PROCESSING APPARATUS AND IMAGE PROCESSING METHOD

CROSS-REFERENCE TO RELATED APPLICATIONS

This application is based upon and claims the benefit of priority from the prior Japanese Patent Application No. 2006-141669 filed on May 22, 2006, the entire contents of which are incorporated herein by reference.

BACKGROUND OF THE INVENTION

1. Field of the Invention

This invention relates to image data processing, and more particularly to a process for amplifying an image data signal.

2. Description of Related Art

For example, in a digital still camera, a shutter speed must be increased to avoid blurring of images due to hand movement when photography is performed in the dark. As a result, the signal strength of image data picked up with the camera is lowered. If the signal strength of image data is heightened by raising a gain with a general digital gain, noise will be disadvantageously increased. Therefore, a sensitizing technique is required for amplifying an image data signal while restricting an increase in noise. A conventional method used as the sensitizing technique when image data is sensitized m times is carried out such that the value of a target pixel and the value of m pixels around the target pixel are added together in each target pixel.

Japanese Unexamined Patent Publication No. H07-249128 and Japanese Unexamined Patent Publication No. H05-12440 are disclosed as the related techniques.

SUMMARY OF THE INVENTION

However, in these conventional techniques, a single pixel signal is acquired from m pixel signals. Therefore, to obtain an effect amplified m times, an image size must be reduced to 1/m. This is a problem. Another problem is that a sense of resolution (also termed "seeming resolution") is lowered by the low-pass filter effect.

The present invention has been made to solve at least one of the above problems. It is therefore an object of the present invention to provide an image processing apparatus and an image processing method for amplifying an image signal without reducing an image size and without losing the sharpness of the outline of an image while preventing a decrease in the sense of resolution.

To achieve the object of the present invention, according to a first aspect of the present invention, there is provided an image processing apparatus for processing and enhancing image data at K-times sensitization rate, the image processing apparatus comprising: a spatial filtering process section that performs a sensitization process by use of a spatial filter having a coefficient matrix in which the sum total of coefficients becomes equal to the K-times sensitization rate; an edge detecting circuit that detects a rate of change in signal strength of each pixel in at least two mutually different directions centering on a target pixel in an image region corresponding to the coefficient matrix; and an assigning circuit that assigns the coefficient matrix the coefficient in which weighting is applied in a direction small in the rate of change at a higher distribution ratio than other directions.

Furthermore, according to a second aspect of the present invention, there is provided an image processing method for processing and enhancing image data at K-times sensitization rate, the image processing method comprising: a step of performing a sensitization process by use of a spatial filter including a coefficient matrix in which a sum total of coefficients becomes equal to the K-times sensitization rate; a step of detecting a rate of change in signal strength of each pixel in at least two mutually different directions centering on a target pixel in an image region corresponding to the coefficient matrix; and a step of assigning the coefficient matrix the coefficient in which weighting is applied in a direction small in the rate of change at a higher distribution ratio than other directions.

An image data processing apparatus and an image data processing method according to the present invention enhance image data at K-times sensitization rate. The sensitization of image data is performed by a product-sum calculation that uses the value of a target pixel and the value of a pixel near this target pixel in each target pixel by use of a spatial filter in which the sum total of coefficients becomes equal to K-times sensitization rate. Accordingly, the signal strength of a target pixel is amplified by a calculation that uses the value of the target pixel and the value of a pixel therenear in an image region corresponding to a coefficient matrix.

In a spatial filtering process section or in a sensitizing step, a sensitization process is performed with a spatial filter including a coefficient matrix in which the sum total of coefficients becomes equal to the K-times sensitization rate. The spatial filter includes an N×N coefficient matrix (N is a natural number). The spatial filter applies a spatial filtering process to N×N image data in an image region corresponding to a coefficient matrix. A low-pass filter or a high-pass filter can be mentioned as an example of the spatial filter. In practice, the spatial filtering process is expressed by the linear sum (sum of products, weighting addition) with respect to the N×N matrix, and is performed by a product-sum calculation using the values of pixels near a target pixel including the target pixel.

In an edge detecting circuit or in a step of detecting the rate of change, the rate of change in signal strength of each pixel in at least two mutually different directions centering on a target pixel in an image region corresponding to a coefficient matrix is detected. The term "edge" denotes a part that has a significant change in signal strength and that has boundaries or level differences in an image region. Herein, the direction of edge detection will be described taking an image region corresponding to a 3×3 coefficient matrix as an example. In this case, regarding a center pixel in the image region as a target pixel, the number of directions of edge detection is four, i.e., a vertical direction, a horizontal direction, an obliquely upward right direction, and an obliquely upward left direction. The rate of change in signal strength in at least two mutually different directions of these four directions is detected.

In an assigning circuit or in an assigning step, a coefficient in which weighting is applied in a direction small in the rate of change at a higher distribution ratio than other directions is assigned to a coefficient matrix. The wording "direction small in the rate of change" means a direction that has a small boundary or a small level difference of signal strength. Herein, for example, if it is detected that the rate of change in signal strength of a pixel in the vertical direction is small, the coefficient in the vertical direction is regarded as being greater than coefficients in the other directions. An assigning operation may be performed by preparing a table that includes a plurality of coefficient matrixes in each of which coefficients weighted in mutually different directions centering on a target pixel are pre-arranged and by selecting a coefficient matrix corresponding to a direction small in the rate of change. Additionally, the assigning operation may be performed by calculating a weight coefficient in accordance with the rate of change.

A coefficient matrix obtained by the assigning circuit is used, and a sensitization process by a spatial filter is performed with respect to an image region corresponding to the coefficient matrix. Thereafter, an N×N region by this coefficient matrix is processed while scanning an original image, thus obtaining a processed image for one frame.

As described above, according to the image data processing apparatus and the image data processing method according to the present invention, a coefficient in which weighting is applied in a direction small in the rate of change at a higher distribution ratio than other directions is assigned to a coefficient matrix, and hence the coefficient of the spatial filter can be changed in accordance with a direction small in the rate of change. Additionally, a sensitization process can be performed by a spatial filtering process using this spatial filter. Therefore, a low-pass filtering process can be selectively performed in a direction having no edge.

As a result, a sense of resolution can be prevented from being lost during the low-pass filtering process, and the sharpness of the outline of an image can be maintained. Additionally, since a sensitization process can be performed using the low-pass filter, an increase in noise caused during the sensitization process can be restricted.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 5 shows spatial filter kernels 71a through 73a;

FIG. 6 shows spatial filter kernels 81a through 83a;

DETAILED DESCRIPTION OF THE PREFERRED EMBODIMENTS

Figure 1:
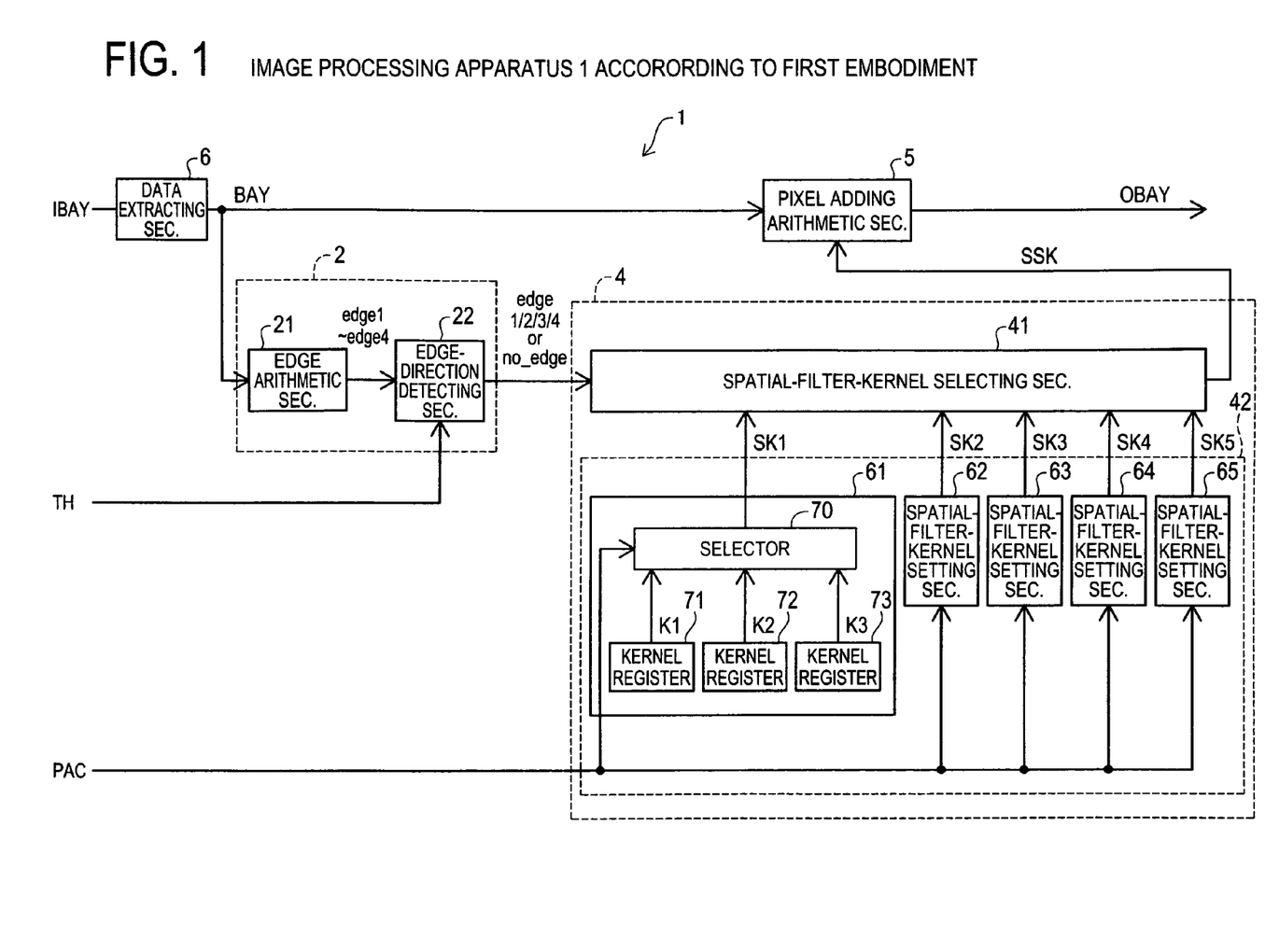
FIG. 1 shows an image processing apparatus 1 according to a first embodiment.

A detailed description will be hereinafter given of embodiments of an image processing apparatus, an image processing method, and its program of the present invention with reference to the accompanying drawings of FIG. 1 to FIG. 9. A first embodiment of the present invention will be described with reference to FIG. 1 to FIG. 7. FIG. 1 shows an image processing apparatus 1 according to the first embodiment. The image processing apparatus 1 includes an edge-direction detecting arithmetic section 2, an assigning arithmetic section 4, a pixel adding arithmetic section 5, and a data extracting section 6.

5×5 matrix-like Bayer data IBAY is input to the data extracting section 6 from, for example, an image sensor not shown. 3×3 matrix-like extracted Bayer data BAY is output from the data extracting section 6.

The edge-direction detecting arithmetic section 2 includes an edge arithmetic section 21 and an edge-direction detecting section 22. Extracted Bayer data BAY is input to the edge arithmetic section 21, and edge detection values edge1 to edge4 are output therefrom. Edge detection values edge1 to edge4 and a threshold value TH are input to the edge-direction detecting section 22. Any one of the edge detection values edge1 to edge4 and an edge nondetection signal no_edge is output as a flag signal from the edge-direction detecting section 22.

The assigning arithmetic section 4 includes a spatial-filter-kernel selecting section 41 and a spatial-filter-kernel outputting section 42. Herein, the term "spatial filter kernel" denotes a coefficient matrix for weighting addition used in spatial filters. The spatial-filter-kernel outputting section 42 includes spatial-filter-kernel setting sections 61 to 65. A pixel addition coefficient PAC is input to each of the spatial-filter-kernel setting sections 61 to 65.

The spatial-filter-kernel setting section 61 includes a selector 70 and kernel registers 71 to 73. A spatial filter kernel corresponding to the value of a pixel addition coefficient PAC is pre-input to each of the kernel registers 71 to 73 from the outside, and is stored therein. The kernel registers 71 to 73 output the spatial filter kernels stored therein as spatial filter kernels K1 to K3, respectively. The pixel addition coefficient PAC and the spatial filter kernels K1 to K3 are input to the selector 70. A spatial filter kernel SK1 is output from the selector 70. Since each of the spatial-filter-kernel setting sections 62 to 65 has the same structure as the spatial-filter-kernel setting section 61, a description of these sections is omitted.

The spatial filter kernels SK1 to SK5 output from the spatial-filter-kernel setting sections 61 to 65, respectively, are input to the spatial-filter-kernel selecting section 41. A selected spatial filter kernel SSK is output from the spatial-filter-kernel selecting section 41, and is input to the pixel adding arithmetic section 5. Extracted Bayer data BAY and a selected spatial filter kernel SSK are input to the pixel adding arithmetic section 5, and output-Bayer-data OBAY is output therefrom.

The operation of the image processing apparatus 1 will be described. The image processing apparatus 1 is an apparatus for performing a spatial filtering process by use of a spatial filter kernel to which a coefficient corresponding to the direction of an edge is assigned. The term "edge" denotes a part that has a significant change in signal strength and that has boundaries or level differences in extracted Bayer data BAY. In this embodiment, a method for performing a calculation in accordance with the direction of an edge in this way is referred to as "applicable pixel addition." The image processing apparatus 1 also performs a sensitization process in accordance with a pixel addition coefficient PAC. The pixel addition coefficient PAC is a value used to set the sensitizability. When the pixel addition coefficient PAC is 2, 3, and 4, the extracted Bayer data BAY is sensitized (i.e., intensified) to be twice, three times, and four times as high as before, respectively. A case in which the pixel addition coefficient PAC is 2 will be hereinafter described as an example.

Figure 2:
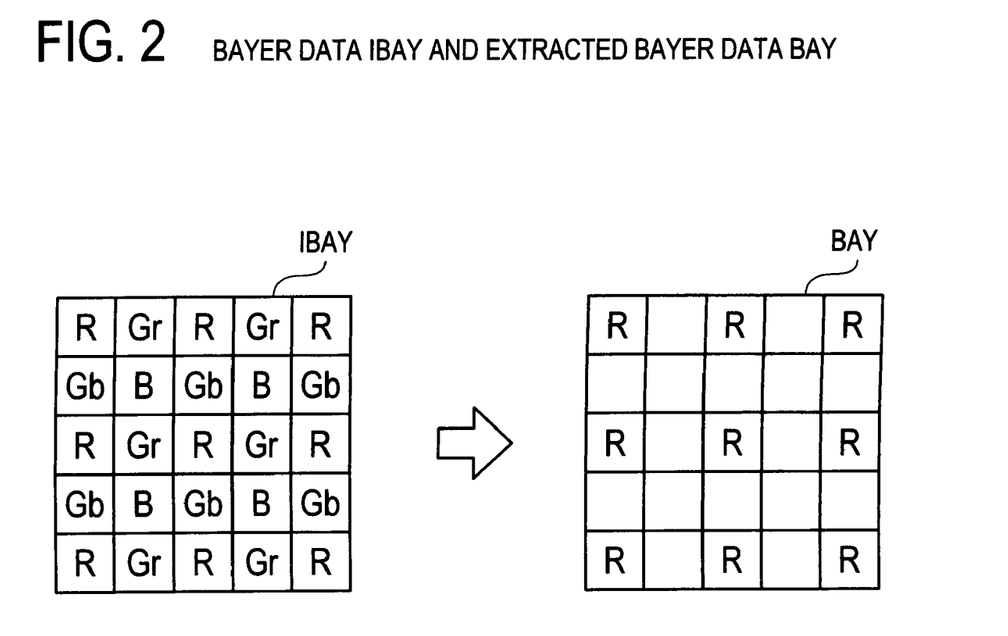
FIG. 2 shows Bayer data IBAY and extracted Bayer data BAY.

The data extracting section 6 performs data extraction. As shown in FIG. 2, Bayer data IBAY of the Bayer type consisting of a 5×5 matrix (i.e., five by five matrix) is input to the data extracting section 6. The data extracting section 6 extracts 3×3 matrix-like extracted Bayer data BAY by extracting surrounding homochromatic pixels present in four directions, i.e., in a vertical direction, in a horizontal direction, in an obliquely upward right direction, and in an obliquely upward left direction centering on a target pixel (R pixel) that is present at the center of the 5×5 matrix Bayer data IBAY. The extracted Bayer data BAY extracted therefrom is input to the edge-direction detecting arithmetic section 2 and to the pixel adding arithmetic section 5.

Figure 3:
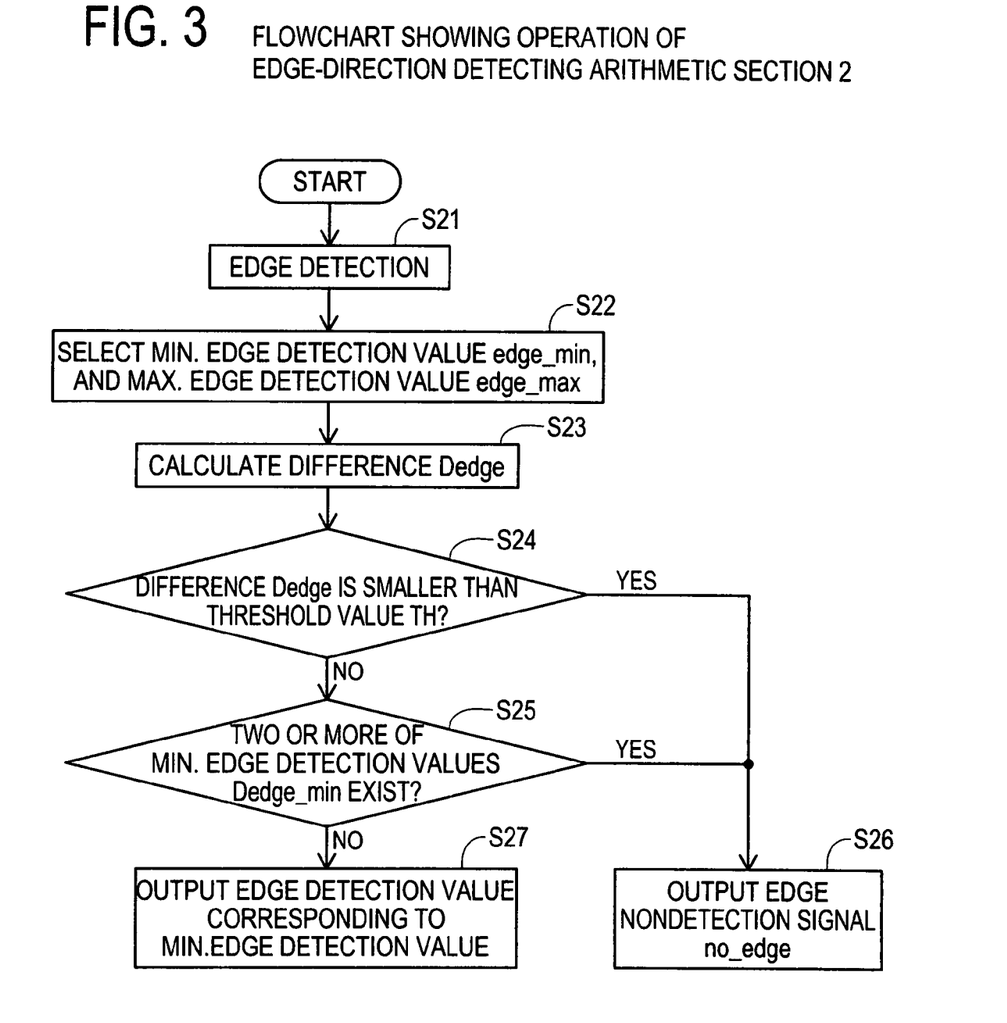
FIG. 3 is a flowchart showing the operation of an edge-direction detecting arithmetic section 2.
Figure 4:
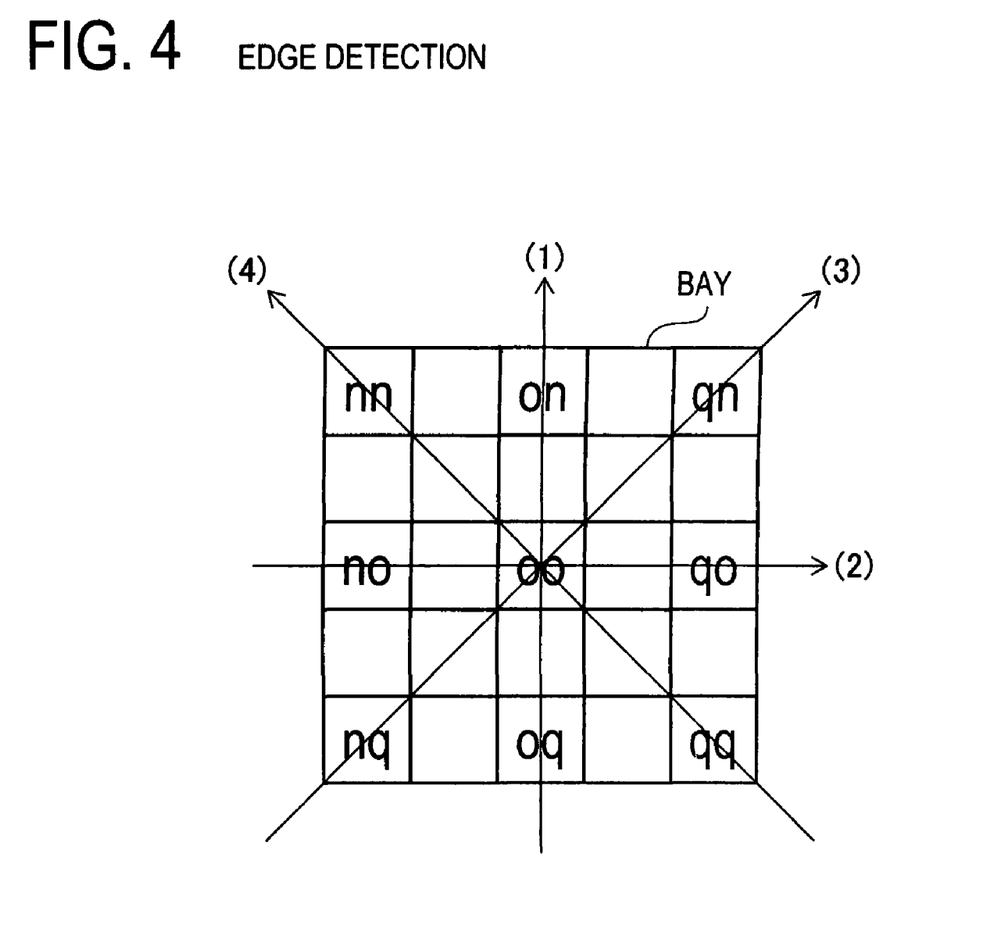
FIG. 4 shows edge detection.

Next, the operation of the edge-direction detecting arithmetic section 2 will be described with reference to the flowchart of FIG. 3. The edge-direction detecting arithmetic section 2 is a circuit that detects an edge minimum direction from the extracted Bayer data BAY. The extracted Bayer data BAY is input to the edge arithmetic section 21 of the edge-direction detecting arithmetic section 2. Thereafter, the edge arithmetic section 21 performs edge detection (step S21). The edge detection is performed by calculating a difference between the signal strength of symmetrically located pixels centering on a target pixel oo located at the center of the extracted Bayer data BAY and the signal strength of the target pixel as shown in FIG. 4. In more detail, edge detection values edge1 to edge4 are obtained by calculating a difference between surrounding homochromatic pixels in the four directions, i.e., in the vertical direction (1), in the horizontal direction (2), in the obliquely upward right direction (3), and in the obliquely upward left direction (4). The edge detection values edge1 to edge4 can be obtained according to the following equations.

$$\text{Edge detection value edge1} = |oo - on| + |oo - oq| \quad \text{Equation (1)}$$

$$\text{Edge detection value edge2} = |oo - no| + |oo - qo| \quad \text{Equation (2)}$$

$$\text{Edge detection value edge3} = |oo - qn| + |oo - nq| \quad \text{Equation (3)}$$

$$\text{Edge detection value edge4} = |oo \times nn| + |oo - qq| \quad \text{Equation (4)}$$

These edge detection values edge1 to edge4 are input to the edge-direction detecting section 22.

Thereafter, the edge-direction detecting section 22 performs edge detection in an edge minimum direction (steps S22 to S27). The term "edge minimum direction" denotes a direction in which the rate of change in signal strength comes to a minimum level in the extracted Bayer data BAY. At step S22, the minimum value among the edge detection values edge1 to edge4 is selected as a minimum edge detection value edge_min. On the other hand, the maximum value among the edge detection values edge1 to edge4 is selected as a maximum edge detection value edge_max. These are not limited to a single value. For example, if two minimum values exist and have the same value, two minimum edge detection values edge_min will exist.

At step S23, a difference Dedge is calculated between the maximum edge detection value edge_max and the minimum edge detection value edge_min. At step S24, a determination is made as to whether or not the difference Dedge is smaller than a threshold value TH. If the difference Dedge is smaller than the threshold value TH (S24: YES), it is judged that the edge minimum direction has not been detected. Accordingly, the process proceeds to step S26, where an edge nondetection signal no_edge is output from the edge-direction detecting section 22. On the other hand, if the difference Dedge is greater than the threshold value TH (S24: NO), it is judged that the edge minimum direction has been detected, and hence the process proceeds to step S25.

The threshold value TH can be set at an arbitrary value in accordance with the kind of an image, user's taste for image quality, and so forth. In this connection, there is a characteristic in the fact that the edge detection becomes more difficult in proportion to a rise in the threshold value TH to be set, whereas the edge detection becomes easier in proportion to a fall in the threshold value TH to be set. Therefore, a sense of resolution can be made higher by setting the threshold value TH at a smaller value.

At step S25, a determination is made as to whether or not two or more minimum edge detection values edge_min having the same value exist. If two or more minimum edge detection values edge_min having the same value exist (S25: YES), it is judged that the edge direction has not been correctly detected, and the process proceeds to step S26, where an edge nondetection signal no_edge is output from the edge-direction detecting section 22. On the other hand, if two or more minimum edge detection values edge_min having the same value do not exist (S25: NO), it is judged that the edge direction has been correctly detected, and the process proceeds to step S27, where an edge detection value corresponding to the minimum edge detection value edge_min is output from the edge-direction detecting section 22. For example, when the minimum edge detection value edge_min is the edge detection value edge1, this edge detection value edge1 is output from the edge-direction detecting section 22.

Next, the operation of the assigning arithmetic section 4 will be described. The assigning arithmetic section 4 is a circuit that assigns coefficients to the matrix of the spatial filter kernel. The assigning arithmetic section 4 is characterized in that weighting is performed in the edge minimum direction of the extracted Bayer data BAY, thus assigning the coefficients thereto.

The assigning arithmetic section 4 includes the spatial-filter-kernel selecting section 41 and the spatial-filter-kernel outputting section 42. The spatial-filter-kernel outputting section 42 is a circuit that outputs the spatial filter kernels SK1 to SK5 corresponding to the output of the edge-direction detecting section 22. The spatial-filter-kernel selecting section 41 is a circuit that selects any one of the spatial filter kernels SK1 to SK5 input from the spatial-filter-kernel outputting section 42 in accordance with the output of the edge-direction detecting section 22 and that outputs the kernel selected from thereamong to the pixel adding arithmetic section 5 as a selected spatial filter kernel SSK.

The spatial-filter-kernel outputting section 42 includes the spatial-filter-kernel setting sections 61 to 65. The spatial-filter-kernel setting sections 61 to 64 are circuits that output spatial filter kernels used when the edge minimum direction is a vertical direction, a horizontal direction, an obliquely upward right direction, and an obliquely upward left direction to the spatial-filter-kernel selecting section 41. The spatial-filter-kernel setting section 65 is a circuit that outputs a spatial filter kernel used when the edge minimum direction is not detected to the spatial-filter-kernel selecting section 41.

Figure 5:
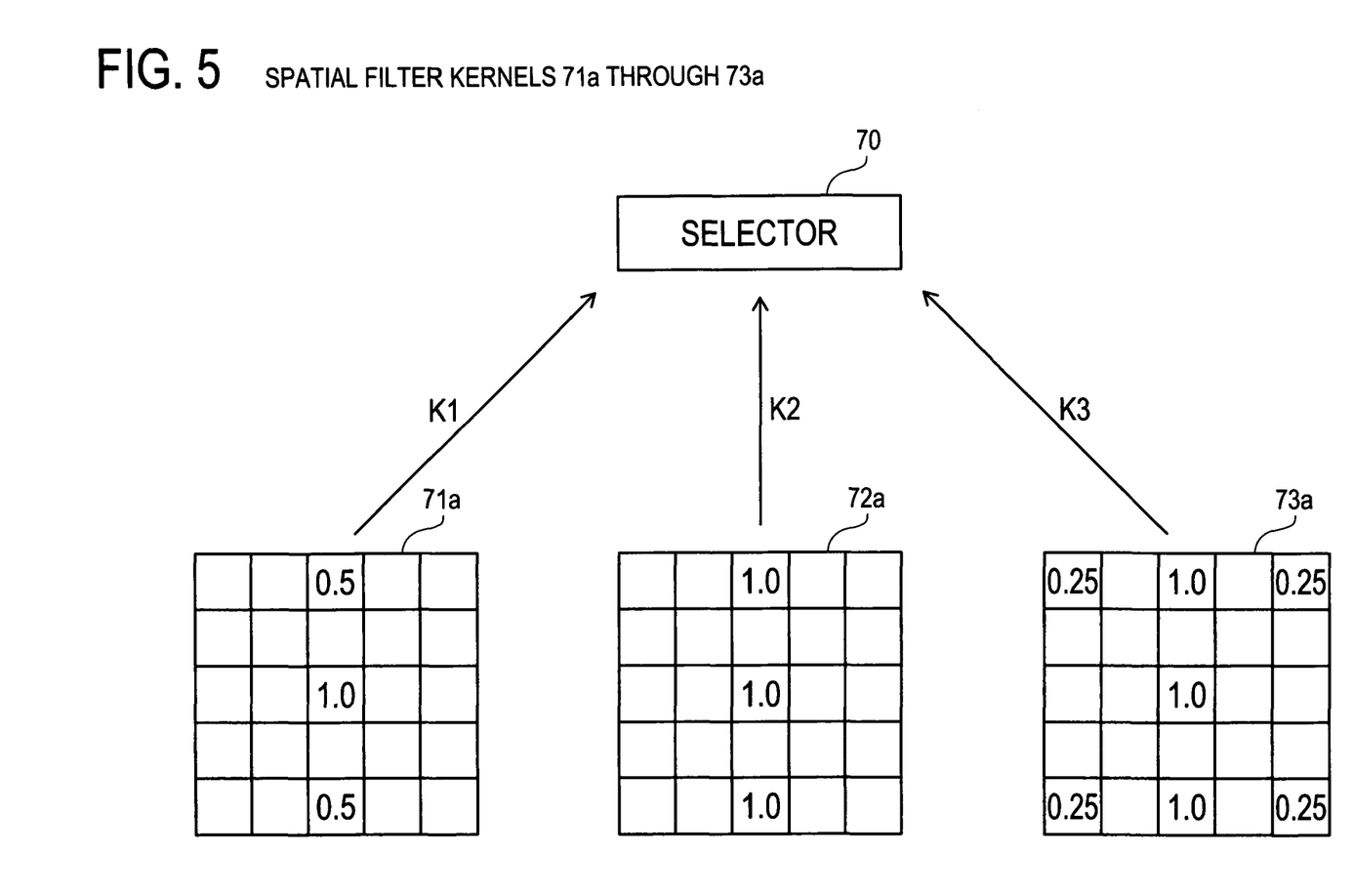

The operation of the spatial-filter-kernel setting section 61 will be described as an example. The spatial-filter-kernel setting section 61 includes the kernel registers 71 to 73. As shown in FIG. 5, spatial filter kernels 71a to 73a are held by the kernel registers 71 to 73, respectively. Each of the spatial filter kernels 71a to 73a is a 3×3 spatial filter kernel used when the edge minimum direction is a vertical direction. As shown in FIG. 5, coefficients in the vertical direction are set to be greater than those in the other directions. The spatial filter kernel 71a is a spatial filter kernel in which the sum total of coefficients is 2 and that is used to double the sensitization. Therefore, the spatial filter kernel 71a is a spatial filter kernel corresponding to a pixel addition coefficient PAC equal to 2. Likewise, the spatial filter kernel 72a is 3 in the sum total of coefficients, and corresponds to a pixel addition coefficient PAC equal to 3. Likewise, the spatial filter kernel 73a is 4 in the sum total of coefficients, and corresponds to a pixel addition coefficient PAC equal to 4.

The spatial filter kernels 71a to 73a can be arbitrarily set by, for example, a register in accordance with the kind of an image, user's taste for image quality, and so forth. A sense of resolution of an image that has undergone a low-pass filtering process can be improved by assigning coefficients to the spatial filter kernels so as to apply greater weighting in the edge minimum direction.

The selector 70 is a circuit that selects any one of the spatial filter kernels 71a to 73a in accordance with the pixel addition coefficient PAC. When the set value of the pixel addition coefficient PAC is 2, the double-addition spatial filter kernel 71a is selected. When the set value of the pixel addition coefficient PAC is 3, the triple-addition spatial filter kernel 72a is selected. When the set value of the pixel addition coefficient PAC is 4, the quadruple-addition spatial filter kernel 73a is selected. In this embodiment, a case in which the pixel addition coefficient PAC is 2 is described, and hence the spatial filter kernel 71a is selected by the selector 70 as a spatial filter kernel SK1.

Figure 6:
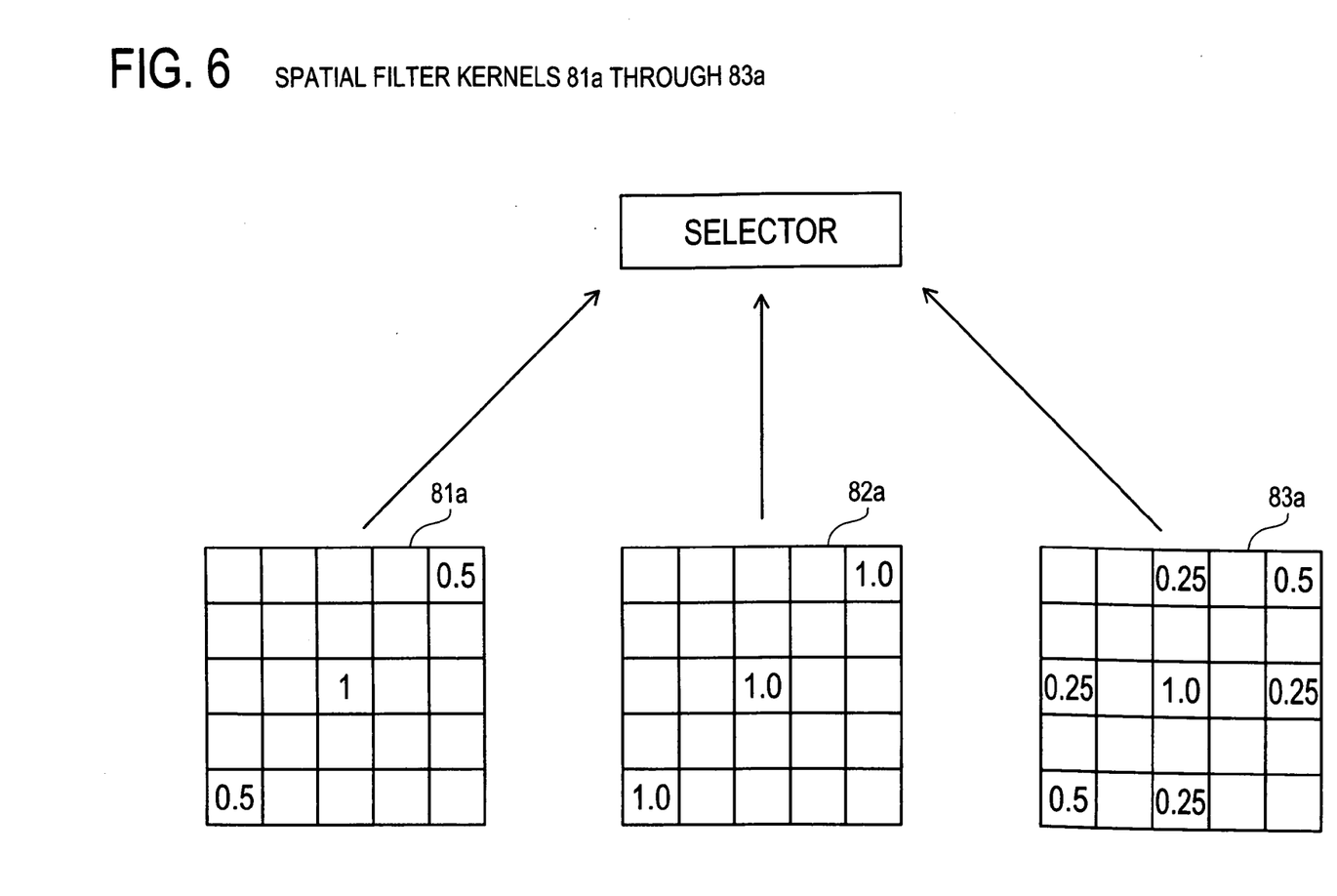

The operation of the spatial-filter-kernel setting section 63 will be described as an example. The spatial-filter-kernel setting section 63 is a circuit that outputs a spatial filter kernel used when the edge minimum direction is an obliquely upward right direction. As shown in FIG. 6, spatial filter kernels 81a to 83a are held by the kernel registers of the spatial-filter-kernel setting section 63. The spatial filter kernels 81a, 82a, and 83a are spatial filter kernels corresponding when the pixel addition coefficient PAC is 2, 3, and 4, respectively. The spatial-filter-kernel setting section 63 and related structures are the same as the spatial-filter-kernel setting section 61 and related structures, and hence a description thereof is omitted.

The operation of the spatial-filter-kernel setting section 65 will be described as an example. The spatial-filter-kernel setting section 65 is a circuit that outputs a spatial filter kernel used when the edge minimum direction is not detected to the spatial-filter-kernel selecting section 41. A spatial filter kernel used to perform a low-pass filtering process by the weighting addition that is uniform in all directions is held by the kernel register of the spatial-filter-kernel setting section 65. The spatial filter kernel shown by the following equation (5) is mentioned as an example.

Output Bayer data $OBAY=(oo*k0+(on+oq)*k1+(no+qo)*k2+(nn+qn+nq+qq)*k3)/64$   Equation (5)

Herein, the symbols, such as "oo" and "on," correspond to those in the extracted Bayer data BAY of FIG. 4.

Three kinds of set values of the coefficients k0 to k3 are prepared so that the sum total of coefficients comes to 2, 3, and 4 in accordance with a case in which the pixel addition coefficient PAC is 2, 3, and 4, respectively. The coefficients k0 to k3 can be arbitrarily set by, for example, registers in accordance with the kind of an image or the like. Accordingly, the response characteristic of the low-pass filter can be controlled by the coefficients k0 to k3. For example, if the coefficient k0 is weighted, characteristics closer to high frequencies can be obtained, and, if the coefficients K1 to k3 are weighted, characteristics closer to low frequencies can be obtained.

Figure 7:
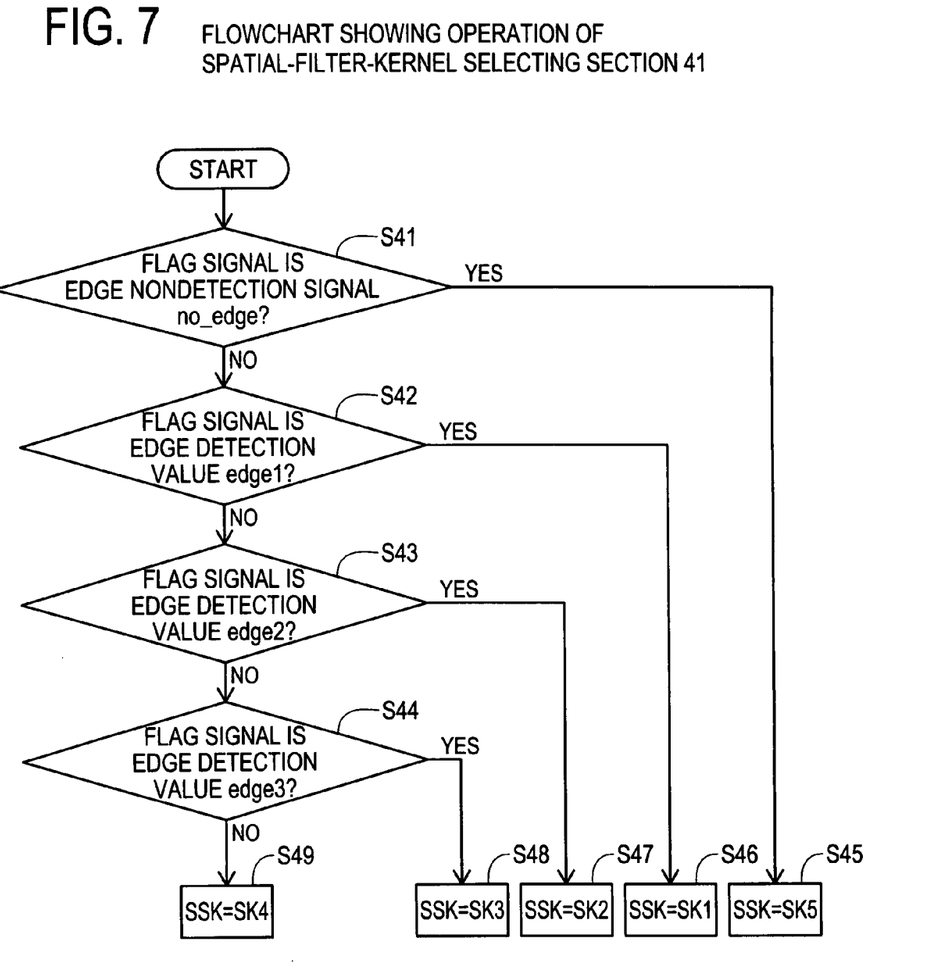
FIG. 7 is a flowchart showing the operation of a spatial-filter-kernel selecting section 41.

The operation of the spatial-filter-kernel selecting section 41 will be described with reference to the flowchart of FIG. 7. First, a determination is made as to whether or not a flag signal input from the edge-direction detecting section 22 is an edge nondetection signal no_edge (step S41). If the flag signal is an edge nondetection signal no_edge (S41: YES), the process proceeds to step S45, where the spatial filter kernel SK5 is selected as a selected spatial filter kernel SSK. On the other hand, if the flag signal is not an edge nondetection signal no_edge (S41: NO), the process proceeds to step S42.

At step S42, a determination is made as to whether or not a flag signal input from the edge-direction detecting section 22 is an edge detection value edge1. If the flag signal is an edge detection value edge1 (S42: YES), the process proceeds to step S46, where the spatial filter kernel SK1 is selected as a selected spatial filter kernel SSK. On the other hand, if the flag signal is not an edge detection value edge1 (S42: NO), the process proceeds to step S43.

Likewise, at step S43, if the flag signal is an edge detection value edge2 (S43: YES), the process proceeds to step S47, where the spatial filter kernel SK2 is selected as a selected spatial filter kernel SSK. If the flag signal is not an edge detection value edge2 (S43: NO), the process proceeds to step S44.

At step S44, if the flag signal is an edge detection value edge3 (S44: YES), the process proceeds to step S48, where the spatial filter kernel SK3 is selected as a selected spatial filter kernel SSK. If the flag signal is not an edge detection value edge2 (S44: NO), the process proceeds to step S49, where the spatial filter kernel SK4 is selected as a selected spatial filter kernel SSK.

In this embodiment, a description is given of a case in which a flag signal input from the edge-direction detecting section 22 is an edge detection value edge1. Therefore, the spatial filter kernel SK1 is selected as a selected spatial filter kernel SSK.

In the pixel adding arithmetic section 5, a sensitization process is applied to the extracted Bayer data BAY. This sensitization process is performed by a spatial filtering process. In more detail, the sensitization process is performed by a product-sum calculation between the extracted Bayer data BAY and the selected spatial filter kernel SSK. As a result, the signal strength of a target pixel located at the center of the matrix of the extracted Bayer data BAY is intensified by the spatial filtering process corresponding to a pixel addition coefficient PAC, and is output as output Bayer data OBAY. In other words, the sum total of coefficients of the selected spatial filter kernel SSK comes to 2, 3, and 4 in accordance with the pixel addition coefficient PAC that is 2, 3, and 4, respectively, and, correspondingly therewith, the sensitizability in the pixel adding arithmetic section 5 becomes twice, three times, and four times as high as before.

In this embodiment, the pixel addition coefficient PAC is 2, and the edge detection value edge1 is a minimum value, and hence the spatial filter kernel 71a (see FIG. 5) is selected as a selected spatial filter kernel SSK. Therefore, a spatial filtering process shown by the following equation (6) is performed in the pixel adding arithmetic section 5.

Output Bayer data $OBAY=1.0 \times oo+0.5 \times on+0.5 \times oq$   Equation (6)

Thereafter, an original image is scanned pixel by pixel, and the sensitization process applied to the Bayer data IBAY for one frame is completed, thus obtaining a processed image.

As described in detail as above, according to the image processing apparatus 1 according to the first embodiment, a coefficient in which weighting has been applied to a direction (i.e., edge minimum direction) in which the rate of change in signal strength of each pixel comes to a minimum at a higher distribution ratio than other directions is assigned to a spatial filter kernel, and, as a result, the coefficient of the spatial filter kernel can be changed in accordance with the edge minimum direction. Additionally, a sensitization process can be performed by a spatial filtering process using this spatial filter kernel. Therefore, a low-pass filtering process can be selectively performed in the edge minimum direction. Accordingly, a sense of resolution can be prevented from being lost when the low-pass filtering process is performed, and the sharpness of the outline of an image can be maintained. Additionally, since the sensitization process can be performed during low-pass filtering, it becomes possible to restrict a noise increase caused when sensitized. Additionally, it is possible to stop the occurrence of a situation in which an image size is reduced by performing the sensitization process.

When the edge minimum direction cannot be detected, a coefficient in which weighting has been uniformly applied to all directions can be assigned to a spatial filter kernel. Since the sensitization process can be likewise performed during low-pass filtering, a noise increase caused when sensitized can be prevented.

In the assigning arithmetic section 4, the spatial-filter-kernel setting sections 61 to 64 that are different in the edge minimum direction and the spatial-filter-kernel setting section 65 that is used when the edge minimum direction is not detected are provided, and a spatial filter kernel corresponding to the edge minimum direction specified by the edge-direction detecting arithmetic section 2 is selected. In short, there is no need to assign a coefficient to a spatial filter kernel by performing a calculation in every case. Therefore, calculation time is not necessitated, and hence image data can be subjected to a high-speed sensitization process.

Figure 8:
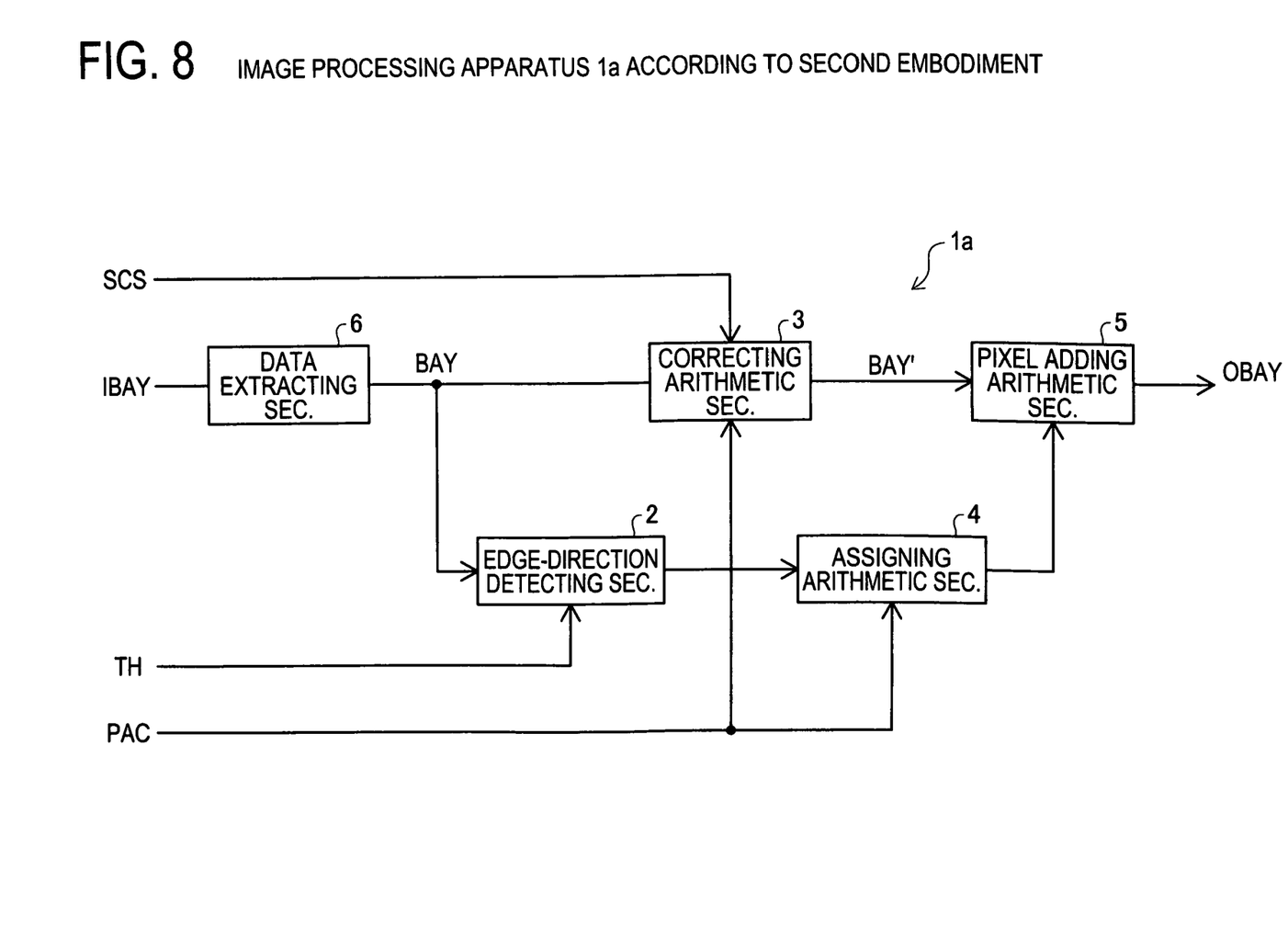
FIG. 8 shows an image processing apparatus 1a according to a second embodiment.
Figure 9:
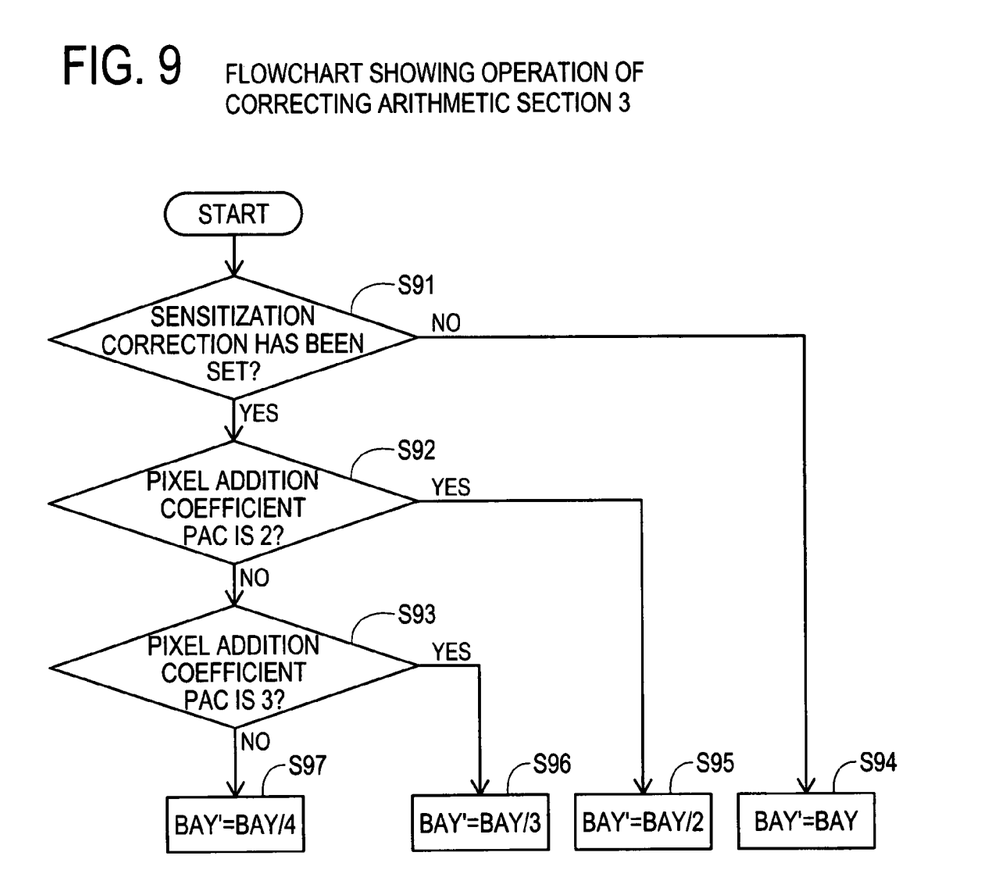
FIG. 9 is a flowchart showing the operation of a correcting arithmetic section 3.

A second embodiment of the present invention will be described with reference to FIG. 8 and FIG. 9. FIG. 8 shows an image processing apparatus 1a according to the second embodiment. The image processing apparatus 1a includes a correcting arithmetic section 3 in addition to the constituents of the image processing apparatus 1. A sensitization correction setting signal SCS, a pixel addition coefficient PAC, and extracted Bayer data BAY are input to the correcting arithmetic section 3. Corrected Bayer data BAY', which has undergone a correction, is output from the correcting arithmetic section 3. In this embodiment, structures other than this are the same as those of the image processing apparatus 1 of FIG. 1, and hence a detailed description thereof is omitted.

The operation of the image processing apparatus 1a will be described. The image processing apparatus 1a is an apparatus that does not perform a sensitization process and that performs only a low-pass filtering process (i.e., a process for selectively performing a process in accordance with the direction of an edge) according to the present invention. Herein, a description will be given of a case in which the pixel addition coefficient PAC is any one of the values 2, 3, and 4.

The operation of the correcting arithmetic section 3 will be described with reference to the flowchart of FIG. 9. The correcting arithmetic section 3 is a circuit that corrects extracted Bayer data BAY so that the sensitization rate of a sensitization process performed by the pixel adding arithmetic section 5 comes to 1. First, a determination is made as to whether or not a sensitization correction has been set by a sensitization correction setting signal SCS input from the outside (step S91). If not (S91: NO), a process is performed for sensitizing the extracted Bayer data BAY at sensitization rate set by the pixel addition coefficient PAC. In this case, there is no need to perform a correction by use of the correcting arithmetic section 3. Therefore, the process proceeds to step S94, where extracted Bayer data BAY is selected as corrected Bayer data BAY'. On the other hand, if a sensitization correction has been set (S91: YES), a correction is performed so that the sensitization rate comes to 1. Therefore, the process proceeds to step S92.

At step S92, a determination is made as to whether or not the value of the pixel addition coefficient PAC is 2. If the value of the pixel addition coefficient PAC is 2 (S92: YES), the process proceeds to step S95, where data obtained by dividing the signal strength of each pixel of the extracted Bayer data BAY by 2 is used as corrected Bayer data BAY'. On the other hand, if the value of the pixel addition coefficient PAC is not 2 (S92: NO), the process proceeds to step S93.

At step S93, if the value of the pixel addition coefficient PAC is 3 (S93: YES), the process proceeds to step S96, where data obtained by dividing the signal strength of each pixel of the extracted Bayer data BAY by 3 is used as corrected Bayer data BAY'. On the other hand, if the value of the pixel addition coefficient PAC is not 3 (S93: NO), the process proceeds to step S97, where data obtained by dividing the signal strength of each pixel of the extracted Bayer data BAY by 4 is used as corrected Bayer data BAY'.

Thereafter, in the pixel adding arithmetic section 5, a sensitization process is applied to the corrected Bayer data BAY'. In the pixel adding arithmetic section 5, a sensitization process is performed at the double, triple, and quadruple sensitization rates in accordance with the value of the pixel addition coefficient PAC that is 2, 3, and 4, respectively. If a sensitization correction has been set, the signal strength of the extracted Bayer data BAY is changed to be half times, one-third times, and one-fourth times the signal strength thereof in accordance with the pixel addition coefficient PAC that is 2, 3, and 4, respectively. Accordingly, in the pixel adding arithmetic section 5, a coefficient corresponding to the pixel addition coefficient PAC is offset, and, as a result, a sensitization process through which the sensitization rate comes to 1 is performed. Therefore, in the image processing apparatus 1a, it becomes possible to perform only a low-pass filtering process without losing a sense of resolution.

As described in detail as above, according to the image processing apparatus 1a according to the second embodiment, only the low-pass filtering process according to the present invention can be performed without performing the sensitization process. In other words, the low-pass filtering process can be selectively performed in the edge minimum direction. As a result, the low-pass filtering process can be performed while preventing a sense of resolution from being lost with respect to image data. Therefore, a process for reducing noise while maintaining the sharpness of the outline of an image can be applied to, for example, image data that has been picked up by adequate exposure and that has proper signal strength.

The present invention is not limited to the above embodiments, and can be, of course, carried out in variously improved or modified forms without exceeding the scope or departing from the essentials of the present invention. In the second embodiment, edge detection in the edge-direction detecting arithmetic section 2 is performed relative to extracted Bayer data BAY that has not yet been corrected and that is output from the data extracting section 6. However, the present invention is not limited to this. It is a matter of course that such edge detection may be performed relative to corrected Bayer data BAY that has already been corrected and that is output from the correcting arithmetic section 3.

Additionally, in the second embodiment, the correcting arithmetic section 3 is provided at the preceding stage of the pixel adding arithmetic section 5, and the signal strength of extracted Bayer data BAY is divided by a value corresponding to a pixel addition coefficient PAC, and is then output to the pixel adding arithmetic section 5. However, the present invention is not limited to this. It is a matter of course that a structure may be employed in which the correcting arithmetic section 3 is disposed at the subsequent stage of the pixel adding arithmetic section 5, and the output Bayer data OBAY output from the pixel adding arithmetic section 5 is divided by a value corresponding to a pixel addition coefficient PAC, and is then output to the next stage circuit. Likewise, in this case, a coefficient corresponding to the pixel addition coefficient PAC is offset, and, as a result, it becomes possible to perform a sensitization process through which sensitization rate comes to 1.

Additionally, in the edge-direction detecting section 22, detection or nondetection in the edge minimum direction is determined based on whether or not a difference Dedge between the maximum edge detection value edge_max and the minimum edge detection value edge_min is smaller than a threshold value TH. However, the present invention is not limited to this. For example, detection or nondetection in the edge minimum direction may be determined based on whether or not a difference between the minimum value among the edge detection values edge1 to edge4 and the second lowest value thereamong is smaller than a threshold value TH.

Additionally, in the assigning arithmetic section 4, the spatial-filter-kernel setting sections 61 to 64 that are different in the edge minimum direction and the spatial-filter-kernel setting section 65 that is used when the edge minimum direction is not detected are provided, and a spatial filter kernel corresponding to the edge minimum direction specified by the edge-direction detecting arithmetic section 2 is selected. However, the present invention is not limited to this. A coefficient may be assigned to a spatial filter kernel by performing a calculation in every case. As a result, the coefficient can be assigned to the spatial filter kernel in a more accurate manner, and hence a spatial filtering process can be performed with higher accuracy.

Additionally, in the first embodiment, the value of the pixel addition coefficient PAC is set at 2, 3, and 4. However, the present invention is not limited to this. It is a matter of course that the pixel addition coefficient PAC may be set at 1. In this case, it is recommended to prepare a spatial filter kernel in which the sum total of coefficients comes to 1. As a result, likewise, in the image processing apparatus 1 (see FIG. 1), only the low-pass filtering process according to the present invention can be performed without performing the sensitization process.

Additionally, in the above embodiment, coefficients are assigned to spatial filter kernels so as to apply greater weighting in the edge minimum direction. However, the present invention is not limited to this. For example, greater weighting may be applied in the edge minimum direction having the smallest edge and in a direction having the second smallest edge. Alternatively, it is a matter of course that weighting may be applied in four edge detecting directions in accordance with an edge detection value. As a result, coefficients can be assigned to spatial filter kernels in a more accurate manner.

Additionally, in the above embodiment, reference is made to the processing of image data having a Bayer arrangement. However, without being limited to this, the same effect can be, of course, obtained in a case in which arrangements other than the Bayer arrangement are employed.

In the above embodiments, the pixel addition coefficient PAC is an example of the sensitizability K, the pixel adding arithmetic section 5 is an example of the spatial filtering process section, the edge-direction detecting arithmetic section 2 is an example of the edge detection circuit, the assigning arithmetic section 4 is an example of the assigning circuit, the spatial-filter-kernel outputting section 42 is an example of the coefficient matrix table portion, and the correcting arithmetic section 3 is an example of the first correcting arithmetic section.

According to the present invention, an image processing apparatus and an image processing method for amplifying an image signal can be provided without reducing an image size and without losing the sharpness of the outline of an image while preventing a decrease in the sense of resolution. For example, in a digital still camera, it is possible to obtain an effect to lessen the blurring of images due to hand movement resulting from an increase in shutter speed and an effect to reduce noise by a low-pass filter, and hence highly-sensitive photography can be performed.

What is claimed is:

1. An image processing apparatus for processing and enhancing image data at K-times sensitization rate, the image processing apparatus comprising:
   a spatial filtering process section that performs a sensitization process by use of a spatial filter having a coefficient matrix in which the sum total of coefficients becomes equal to the K-times sensitization rate;
   an edge detecting circuit that detects a rate of change in signal strength of each pixel in at least two mutually different directions centering on a target pixel in an image region corresponding to the coefficient matrix; and
   an assigning circuit that assigns the coefficient matrix the coefficient in which weighting is applied in a direction small in the rate of change at a higher distribution ratio than other direction.

2. The image processing apparatus according to claim 1, wherein the assigning circuit assigns the coefficient in which weighting is applied in a direction smallest in the rate of change at a higher distribution rate than other directions.

3. The image processing apparatus according to claim 2, wherein the coefficient is assigned without performing the weighting if the number of directions smallest in the rate of change is plural.

4. The image processing apparatus according to claim 2, wherein the coefficient is assigned without performing the weighting if a difference between a maximum value and a minimum value in the rate of change is smaller than a predetermined value.

5. The image processing apparatus according to claim 2, wherein the coefficient is assigned without performing the weighting if a difference between a minimum value in the rate of change and a second lowest value in the rate of change is smaller than a predetermined value.

6. The image processing apparatus according to claim 2, wherein the assigning circuit includes a coefficient matrix table portion having the coefficient matrixes in each of which especially weighted coefficients are pre-disposed in mutually different directions centering on the target pixel, and the coefficient matrix corresponding to the direction smallest in the rate of change is selected from the coefficient matrix table portion.

7. The image processing apparatus according to claim 1, wherein the edge detecting circuit calculates a difference between signal strength of a pixel located symmetrically centering on the target pixel in the image region and signal strength of the target pixel.

8. The image processing apparatus according to claim 1, further comprising a first correcting arithmetic section that divides the signal strength of each pixel in the image region among the input image data by the K-times sensitization rate and then outputs a result obtained thereby to the spatial filtering process section.

9. The image processing apparatus according to claim 1, further comprising a second correcting arithmetic section that divides the signal strength of each pixel in output data of the spatial filtering process section by the K-times sensitization rate and then outputs a result obtained thereby to a next stage circuit.

10. An image processing method for processing and enhancing image data at K-times sensitization rate, the image processing method comprising:
   performing a sensitization process by use of a spatial filter including a coefficient matrix in which a sum total of coefficients becomes equal to the K-times sensitization rate;
   detecting a rate of change in signal strength of each pixel in at least two mutually different directions centering on a target pixel in an image region corresponding to the coefficient matrix; and
   assigning the coefficient matrix the coefficient in which weighting is applied in a direction small in the rate of change at a higher distribution ratio than other direction.

* * * * *